United States Patent
Jeong

[19]

[11] Patent Number: 6,094,432
[45] Date of Patent: Jul. 25, 2000

[54] APPARATUS FOR AND METHOD OF SEGMENTING AND REASSEMBLING CONSTANT BIT RATE TRAFFIC IN ASYNCHRONOUS TRANSFER MODE NETWORK

[75] Inventor: Yong-geun Jeong, Kyunggi-do, Rep. of Korea

[73] Assignee: LG Information & Communications, Ltd., Seoul, Rep. of Korea

[21] Appl. No.: 08/962,571

[22] Filed: Nov. 3, 1997

[30] Foreign Application Priority Data

Nov. 4, 1996 [KR] Rep. of Korea ............... 96-51872

[51] Int. Cl.[7] .................................................. H04L 12/28
[52] U.S. Cl. ................................. 370/395; 370/474
[58] Field of Search ................................ 370/389, 395, 370/366, 545, 465, 466, 467, 474, 230, 231, 232, 252, 253

[56] References Cited

U.S. PATENT DOCUMENTS

| | | | |
|---|---|---|---|
| 5,623,491 | 4/1997 | Skoog | 370/397 |
| 5,680,401 | 10/1997 | Gayton et al. | 370/374 |
| 5,878,045 | 3/1999 | Timbs | 370/474 |
| 5,909,443 | 6/1999 | Fichou et al. | 370/236 |

*Primary Examiner*—Hassan Kizou
*Assistant Examiner*—Daniel Previl
*Attorney, Agent, or Firm*—Fleshner & Kim, LLP

[57] ABSTRACT

A constant bit rate (CBR) traffic segmentation and reassembly apparatus and method are provided, in which an operation for converting CBR traffic included in a T1/E1 frame into an ATM cell and a reverse operation thereof, namely, an operation for converting an ATM cell into CBR traffic and carrying the CBR traffic in a T1/E1 frame are carried out. A standardized and simple status transition is thereby obtained. Accordingly, it is possible to accommodate an increased number of T1/E1 connections. The apparatus of the present invention can also be operatively connected to an ATM switch such as an ATM transceiver. It is thus possible to replace, with the ATM switch, audio switches of a conventional time division multiplex system configured to spatially and temporally exchange PCM data.

13 Claims, 14 Drawing Sheets

Fig. 5b

|  | 7 | 6 | 5 | 4 | 3 | 2 | 1 | 0 |
|---|---|---|---|---|---|---|---|---|
| 0x00 | CSI | \multicolumn{3}{c}{SN} | \multicolumn{4}{c}{SNP} | | | |
| | \multicolumn{8}{c}{Payload 0} |
| 0x2F | \multicolumn{8}{c}{Payload 46} |
| | \multicolumn{8}{c}{Reserved} |
| 0x40 | CSI | SN | | | SNP | | | |
| | \multicolumn{8}{c}{Payload 0} |
| 0x6F | \multicolumn{8}{c}{Payload 46} |
| 0x70 | V | \multicolumn{3}{c}{Reserved} | \multicolumn{4}{c}{CBID} | | | |
| 0x71 | WRSEG | RDSEG | \multicolumn{6}{c}{PTR} | | | | | |
| 0x72 | \multicolumn{2}{c}{CTYPE} | \multicolumn{6}{c}{LENGTH} | | | | |
| 0x73 | \multicolumn{8}{c}{OPN} |
| 0x74 | \multicolumn{4}{c}{GRC} | \multicolumn{4}{c}{VPI(7:4)} | | | | | | |
| 0x75 | \multicolumn{4}{c}{VPI(3:0)} | \multicolumn{4}{c}{VCI(15:12)} | | | | | | |
| 0x76 | \multicolumn{8}{c}{VCI(11:4)} |
| 0x77 | \multicolumn{4}{c}{VCI(3:0)} | \multicolumn{3}{c}{PT} | CLP | | | | | |
| 0x78 | \multicolumn{8}{c}{HEC} |
| | \multicolumn{8}{c}{Reserved} |
| 0x7E | \multicolumn{8}{c}{CCQ} |
| 0x7F | \multicolumn{8}{c}{SNIT} |

Fig. 6b

| | 7 | 6 | 5 | 4 | 3 | 2 | 1 | 0 |
|---|---|---|---|---|---|---|---|---|
| 0x00 | CSI | SN | | | SNP | | | |
| 0x01 | Payload 0 | | | | | | | |
| ... | | | | | | | | |
| 0x2F | Payload 46 | | | | | | | |
| | Reserved | | | | | | | |
| 0x40 | CSI | SN | | | SNP | | | |
| 0x41 | Payload 0 | | | | | | | |
| ... | | | | | | | | |
| 0x6F | Payload 46 | | | | | | | |
| 0x70 | V | Reserved | | | CBID | | | |
| 0x71 | WRSEG | RDSEG | ISCL0 | ISCL1 | CTYPE | LSN | | |
| 0x72 | Reserved | | | PTR | | | | |
| 0x73 | Reserved | | | LENGTH | | | | |
| | Reserved | | | | | | | |
| 0x7F | SNIT | | | | | | | |

Fig. 9

|  | CSI | SN | | | SNP | | | | 16 Digit |
|---|---|---|---|---|---|---|---|---|---|
| 0x007F | 0 | 0 | 0 | 0 | 0 | 0 | 0 | 0 | 00 |
| 0x00FF | 0 | 0 | 0 | 1 | 0 | 1 | 1 | 1 | 17 |
| 0x017F | 0 | 0 | 1 | 0 | 1 | 1 | 0 | 1 | 2D |
| 0x01FF | 0 | 0 | 1 | 1 | 1 | 1 | 0 | 0 | 3A |
| 0x027F | 0 | 1 | 0 | 0 | 1 | 1 | 1 | 0 | 4E |
| 0x02FF | 0 | 1 | 0 | 1 | 1 | 0 | 0 | 1 | 59 |
| 0x037F | 0 | 1 | 1 | 0 | 0 | 0 | 1 | 1 | 63 |
| 0x03FF | 0 | 1 | 1 | 1 | 0 | 1 | 0 | 0 | 74 |
| 0x047F | 1 | 0 | 0 | 0 | 1 | 0 | 1 | 1 | 8B |
| 0x04FF | 1 | 0 | 0 | 1 | 1 | 1 | 0 | 0 | 9C |
| 0x057F | 1 | 0 | 1 | 0 | 0 | 1 | 1 | 0 | A6 |
| 0x05FF | 1 | 0 | 1 | 1 | 0 | 0 | 0 | 1 | B1 |
| 0x067F | 1 | 1 | 0 | 0 | 0 | 1 | 0 | 1 | C5 |
| 0x06FF | 1 | 1 | 0 | 1 | 0 | 0 | 1 | 0 | D2 |
| 0x077F | 1 | 1 | 1 | 0 | 1 | 0 | 0 | 0 | E8 |
| 0x07FF | 1 | 1 | 1 | 1 | 1 | 1 | 1 | 1 | FF |

APPARATUS FOR AND METHOD OF SEGMENTING AND REASSEMBLING CONSTANT BIT RATE TRAFFIC IN ASYNCHRONOUS TRANSFER MODE NETWORK

BACKGROUND OF THE INVENTION

1. Field of the Invention

The present invention relates to an apparatus for and a method of segmentation and reassembly constant bit rate (CBR) traffic in an asynchronous transfer mode (ATM) network, and more particularly to a segmentation and reassembly of CBR traffic apparatus and method in which an operation for converting CBR traffic included in a T1/E1 frame into an ATM cell and a reverse operation thereof, namely, an operation for converting an ATM cell into CBR traffic and carrying the CBR traffic in a T1/E1 frame are carried out.

2. Description of the Prior Art

Typically, conventional CBR traffic segmentation and reassembly systems require a number of constituting units in order to obtain an operative connection between PSTN and ATM networks. For this reason, such conventional CBR traffic segmentation and reassembly systems involve an increase in costs and installation volume.

SUMMARY OF THE INVENTION

Therefore, an object of the invention is to provide an apparatus for and a method of segmentation and reassembly CBR traffic in an ATM network, in which a standardized and simple status transition is achieved, thereby reducing the installation volume and costs.

In order to accomplish this object, the present invention provides an apparatus for segmentation and reassembly constant bit rate traffic in an asynchronous transfer mode (ATM) network comprising: an ATM cell generating unit for reading a value included in an external T1/E1 frame and generating an ATM cell based on the read value; and a T1/E1 frame generating unit for reading an external ATM cell and generating a T1/E1 frame based on the read ATM cell. In accordance with the present invention, the ATM cell generating unit comprises: a state timing generation block for externally receiving clock signals (8K, N*8K and CLK), thereby configuring a finite state machine and a plurality of counters; a serial to parallel converter for externally receiving clock signals (N*8K and N*8*8K) and receiving serial data from a T1/E1 transceiver, the serial to parallel converter serving to convert the received serial data into 8-bit parallel data; a time-slot data to cell block for reading the parallel data from the serial to parallel converter in sync with the clock signal (N*8K) applied thereto via the state timing generation block, extracting time/slot data of the input T1/E1 frame, determining whether or not the extracted data should be discarded, based on control information read from transmit cell buffers, recording the extracted data in an associated transmit cell buffer where the extracted data is effective, and recording an associated cell buffer identification in a complete cell queue when ATM cells are completely accumulated in the associated transmit cell buffer; a transmit cell control block for searching the complete cell queue in response to a signal indicative of the status of the finite state machine configured by the state timing generation block, thereby recording ATM cells (CELL_WR and CELL_DATA) of the associated transmit cell buffer in an external cell buffer; a CPU access block for controlling a CPU and transmit cell buffer access in response to the signal indicative of the status of the finite state machine configured by the state timing generation block, thereby receiving signals (CPU_CS, CPU_RW and CPU_ADDR) from associated CPU's while exchanging CPU data (CPU_DATA) with the associated CPU's; and a transmit cell buffer access block for controlling a transmit cell buffer access among the time-slot data to cell block, transmit cell control block and CPU access block in accordance with the signal indicative of the status of the finite state machine configured by the state timing generation block, thereby applying transmit cell buffer signals (TCB_CS, TCB_RW and TCB_ADDR) to the transmit cell buffer while exchanging transmit cell buffer data (TCB_DATA) with the transmit cell buffer. In accordance with the present invention, the T1/E1 frame generating unit comprises: a state timing generation block for externally receiving clock signals (8K, N*8K and CLK), thereby configuring a finite state machine and a plurality of counters; a receive cell control block for reading an input ATM cell (CELL_DATA) in response to a signal indicative of the status of the finite state machine configured by the state timing generation block, thereby determining whether or not the input ATM cell is effective, and recording the read data (CELL_RD) as an ATM cell in an associated receive cell buffer where the input ATM cell is effective; a cell to time-slot data block for reading receive cell buffers in sync with the clock signal (N*8K) applied thereto via the state timing generation block, and generating parallel data corresponding to the read data in order to record the read data on an associated time/slot of a T1/E1 frame to be generated; a parallel to serial converter for externally receiving clock signals (N*8K and N*8*8K), converting the parallel data received from the cell to time-slot data block into serial, and recording the serial data in an associated time/slot of the T1/E1 frame; a CPU access block for controlling a CPU and transmit cell buffer access in response to the signal indicative of the status of the finite state machine configured by the state timing generation block, thereby receiving CPU signals (CPU_CS, CPU_RW and CPU_ADDR) from associated CPU's while exchanging CPU data (CPU_DATA) with the associated CPU's; and a receive cell buffer access block for controlling a receive cell buffer access among the receive cell control block, CPU access block and cell to time-slot data block in accordance with the signal indicative of the status of the finite state machine configured by the state timing generation block, thereby applying receive cell buffer signals (RCB_CS, RCB_RW and RCB_ADDR) to the receive cell buffer while exchanging receive cell buffer data (RCB_DATA) with the receive cell buffer.

BRIEF DESCRIPTION OF THE DRAWINGS

Other objects and aspects of the invention will become apparent from the following description of embodiments with reference to the accompanying drawings in which:

FIG. 9 is a diagram illustrating recording of a sequence number index table on the map of FIG. 7 or 8 by a CPU;

DESCRIPTION OF THE PREFERRED EMBODIMENTS

Figure 1:
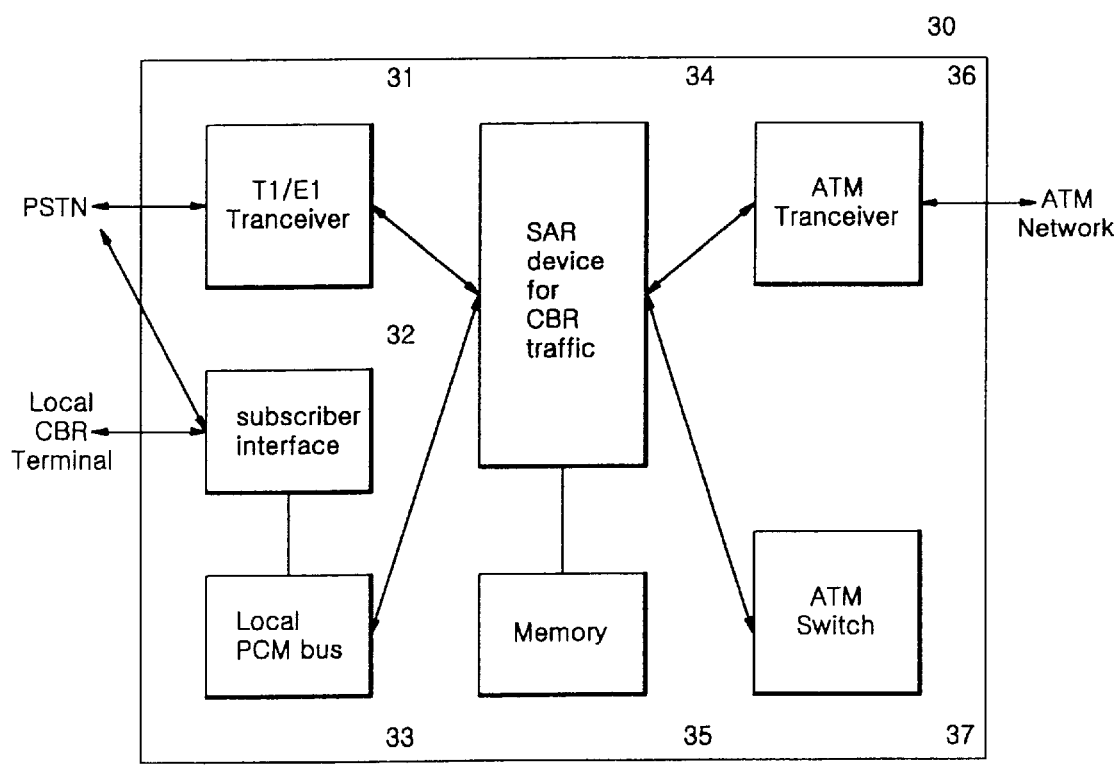
FIG. 1 is a block diagram illustrating an operative connection between an ATM network and a PSTN network to which the present invention is applied.
Figure 2:
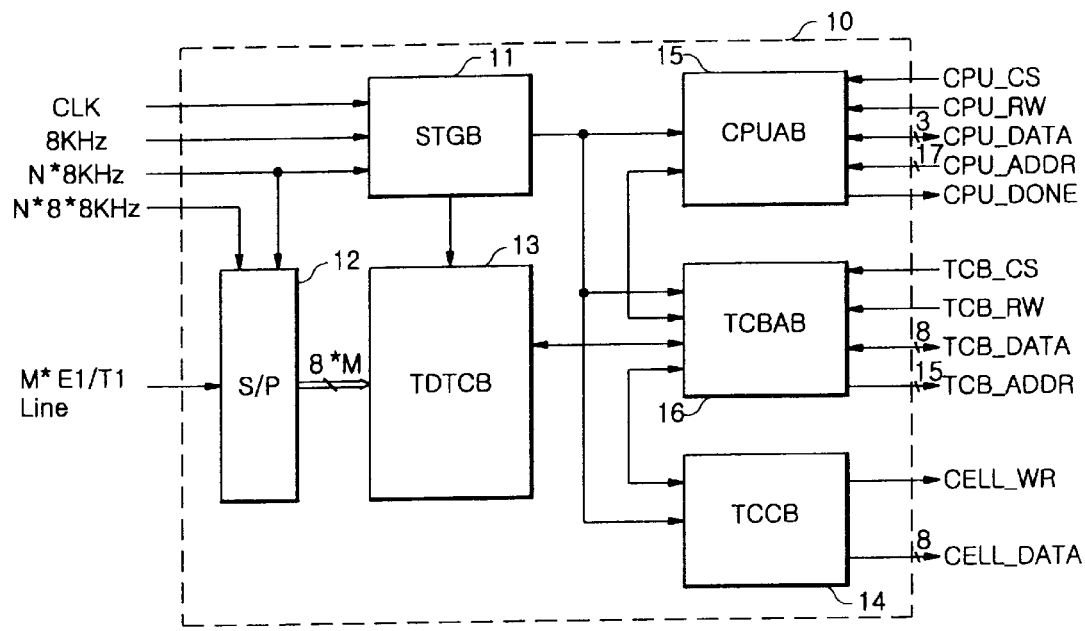
FIG. 2 is a block diagram illustrating an apparatus for segmentation and reassembly CBR traffic in an ATM network in accordance with the present invention.
Figure 2:
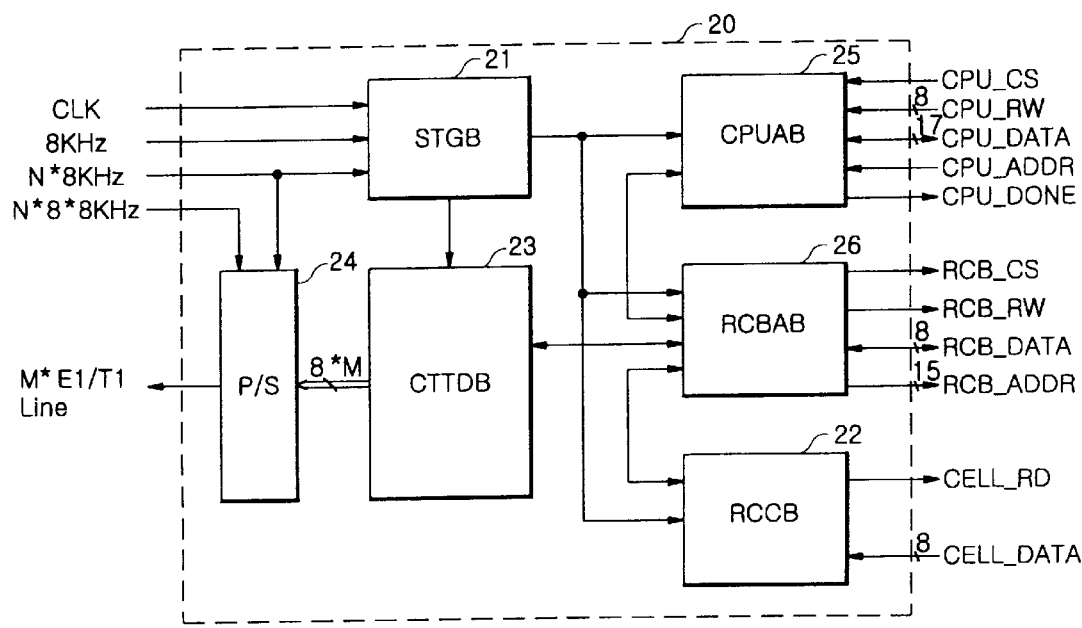

Referring to FIG. 2, an apparatus for segmentation and reassembly CBR traffic in an ATM network in accordance with an embodiment of the present invention is illustrated. As shown in FIG. 2, the CBR traffic segmentation and reassembly apparatus mainly includes two units, namely, an ATM cell generating unit 10 for reading CBR data received from an external T1/E1 transceiver 31 (FIG. 1) and converting the read CBR data into an ATM cell and a T1/E1 frame generating unit 20 for reading an ATM cell received from an external ATM transceiver 36 (FIG. 1), converting the read ATM cell into a T1/E1 frame and transmitting the T1/E1 frame to the T1/E1 transceiver 31.

The ATM cell generating unit 10 includes a state timing generation block (STGB) 11, a serial to parallel converter (S/P) 12, a time-slot data to cell block (TDTCB) 13, a transmit cell control block (TCCB) 14, a CPU access block (CPUAB) 15, and a transmit cell buffer access block (TCBAB) 16.

The STGB 11 externally receives clock signals 8K, N*8K and CLK, thereby configuring a finite state machine (FSM) and a plurality of counters. The clock signal 8K is a network synchronizing signal, the clock signal N*8K is a time/slot (T/S) synchronizing signal, and the clock signal CLK is an operating clock signal.

The S/P 12 externally receives clock signals N*8K and N*8*8K. The S/P 12 also receives serial data from the T1/E1 transceiver 31 and converts the received serial data into 8-bit parallel data. The clock signal N*8*8K is a T/S bit synchronizing clock.

The TDTCB 13 receives the parallel data from the S/P 12 in sync with the clock signal N*8K applied thereto via the STGB 11. The TDTCB 13 reads the received parallel data and extracts T/S data of the T1/E1 frame. The TDTCB 13 also determines whether or not the extracted data should be discarded, based on information about a control for an associated transmit cell buffer (TCB). Where the extracted data is effective, it is recorded in the associated TCB. When ATM cells are completely accumulated in an optional, particular TCB, an associated cell buffer identification (CBID) is recorded in a complete cell queue (CCQ).

The TCCB 14 serves to search the CCQ, thereby recording the data of associated TCB's in an external cell buffer.

The CPUAB 15 controls a TCB access between CPU's and the internal blocks of the ATM cell generating unit 10.

The TCBAB 16 controls a TCB access among the internal blocks of the ATM cell generating unit 10 in accordance with a signal indicative of the status of the FSM configured by the STGB 11.

On the other hand, the T1/E1 frame generating unit 20 includes an STGB 21, a receive cell control block (RCCB) 22, a cell to time-slot data block (CTTDB) 23, a parallel to serial converter (P/S) 24, a CPUAB 25, and a receive cell buffer access block (RCBAB) 26.

The STGB 21 externally receives clock signals 8K, N*8K and CLK, thereby configuring an FSM and a plurality of counters.

The RCCB 22 reads an input ATM cell, thereby determining whether or not the input ATM cell is effective. Where the input ATM cell is effective, the RCCB 22 records the ATM cell in an associated receive cell buffer (RCB).

The CTTDB 23 reads each RCB in sync with the clock signal N*8K applied thereto via the STGB 21 and records the read data on an associated T/S of the T1/E1 frame.

The P/S 24 externally receives clock signals N*8K and N*8*8K. The P/S 24 also receives parallel data from the CTTDB 23 and converts the received parallel data into serial data.

The CPUAB 25 controls an RCB access between the CPU's and the internal blocks of the T1/E1 frame generating unit 20.

The RCBAB 26 controls an RCB access among the internal blocks of the T1/E1 frame generating unit 20 in accordance with a signal indicative of the status of the FSM configured by the STGB 21.

Now, an operation of the CBR traffic segmentation and reassembly apparatus having the above-mentioned configuration according to the present invention will be described.

Figure 3:
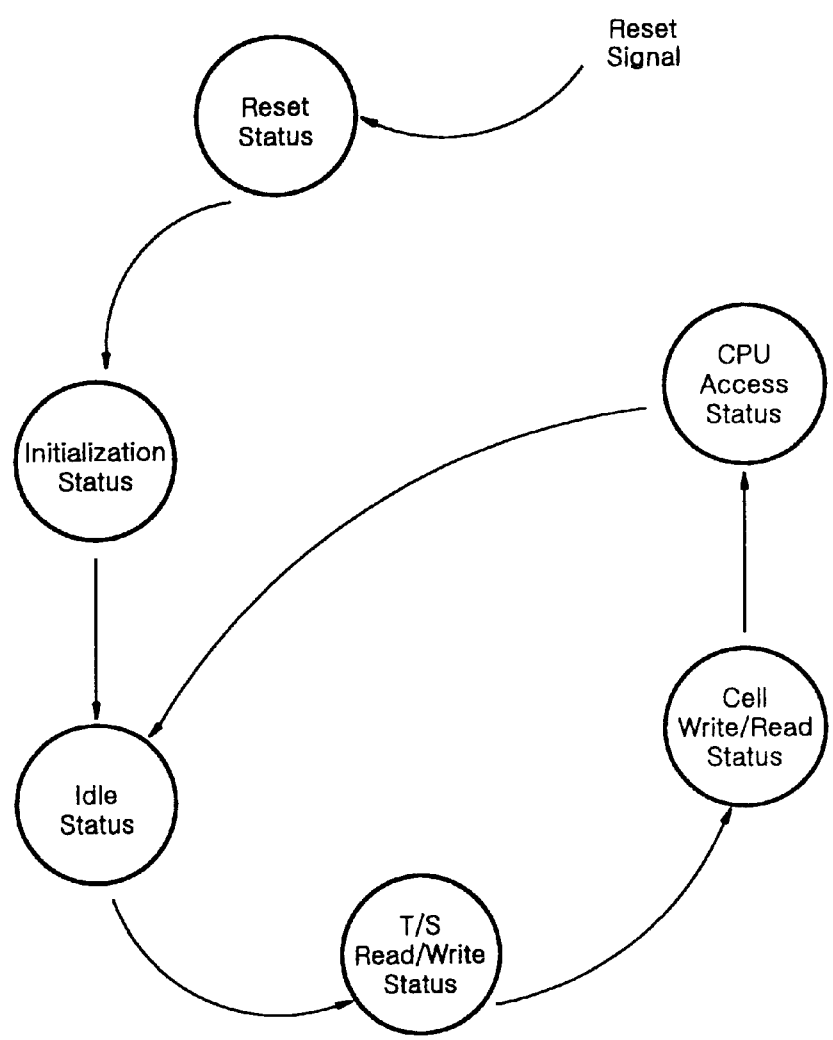
FIG. 3 is a schematic view illustrating six FSM statuses established in the apparatus of FIG. 2.

As shown in FIG. 3, the status of the FSM is determined to correspond to one of six statuses. A signal indicative of the status of the FSM is generated from the STGB 11. As shown in a timing diagram of FIG. 4, the STGB 11 initializes the value of the FSM status signal at a point b while increasing the value at a point a by a T/S counter. The status signal generated from the STGB 11 is transmitted to other blocks.

The RCB's and TCB's, which are buffers for storing ATM cells to be received from an external ATM network and to be transmitted to the external ATM network, are configured as shown in FIGS. 5 and 6, respectively. One RCB and one TCB are allocated for each T/S. Each cell block stores two ATM cells therein. As shown in FIGS. 5 and 6, Each ATM cell has a payload type determined on the basis of a value recorded on a "CTYPE" field thereof. The payload length of each ATM cell is determined by a value recorded on a "LENGTH" field of the ATM cell.

Figure 5A:
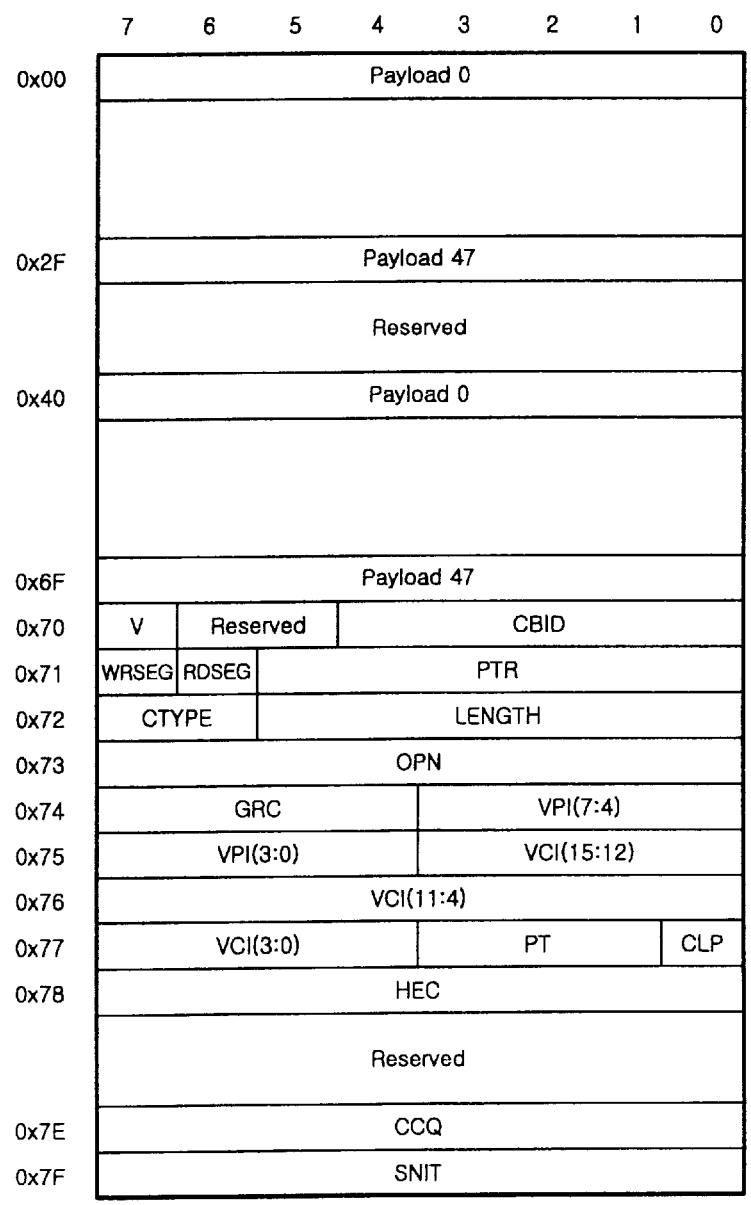
FIG. 5 is a diagram illustrating the configuration of a transmit cell block meeting an ATM cell structure used in the apparatus of FIG. 2.
Figure 6A:
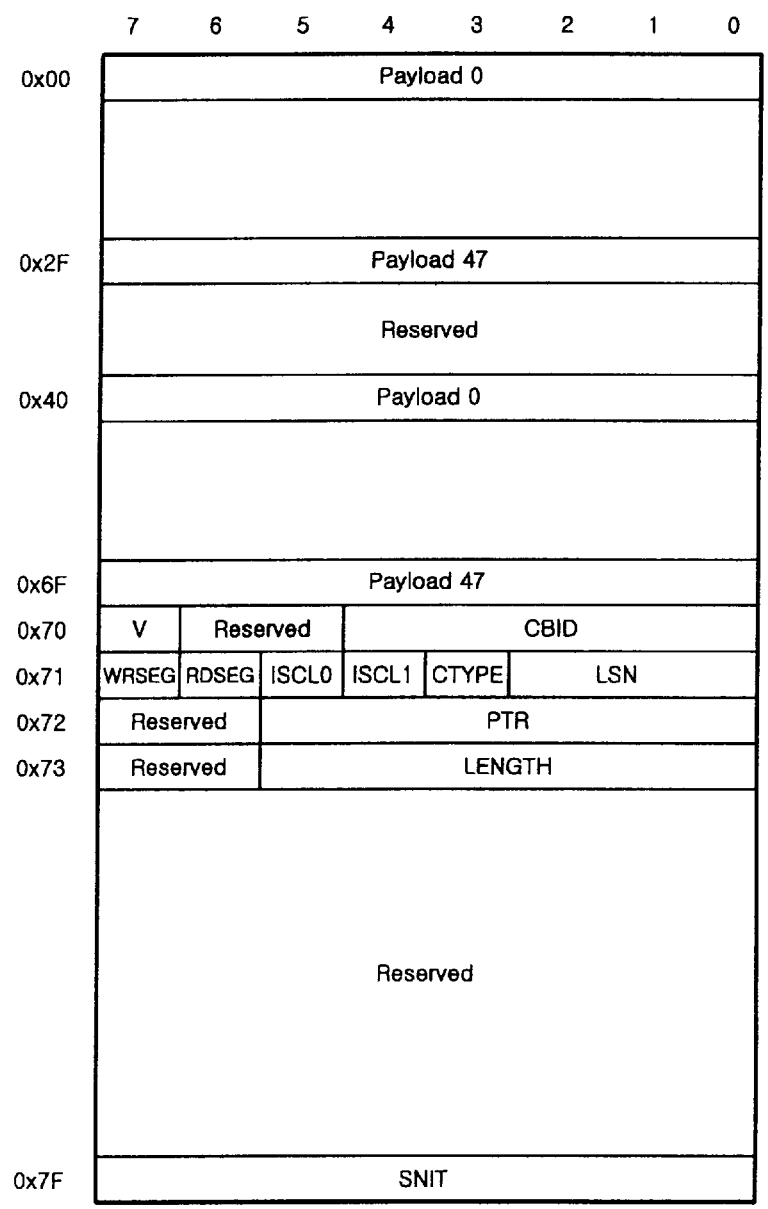
FIG. 6 is a diagram illustrating the configuration of a receive cell block meeting an ATM cell structure used in the apparatus of FIG. 2.

FIG. 5a illustrates a unit TCB in which ATM cells having a cell type of "01" are stored whereas FIG. 5b illustrates a unit TCB in which ATM cells having a cell type of "10" are stored. FIG. 6a illustrates a unit RCB in which ATM cells having a cell type of "01" are stored whereas FIG. 6b illustrates a unit RCB in which ATM cells having a cell type of "10" are stored.

Figure 7:
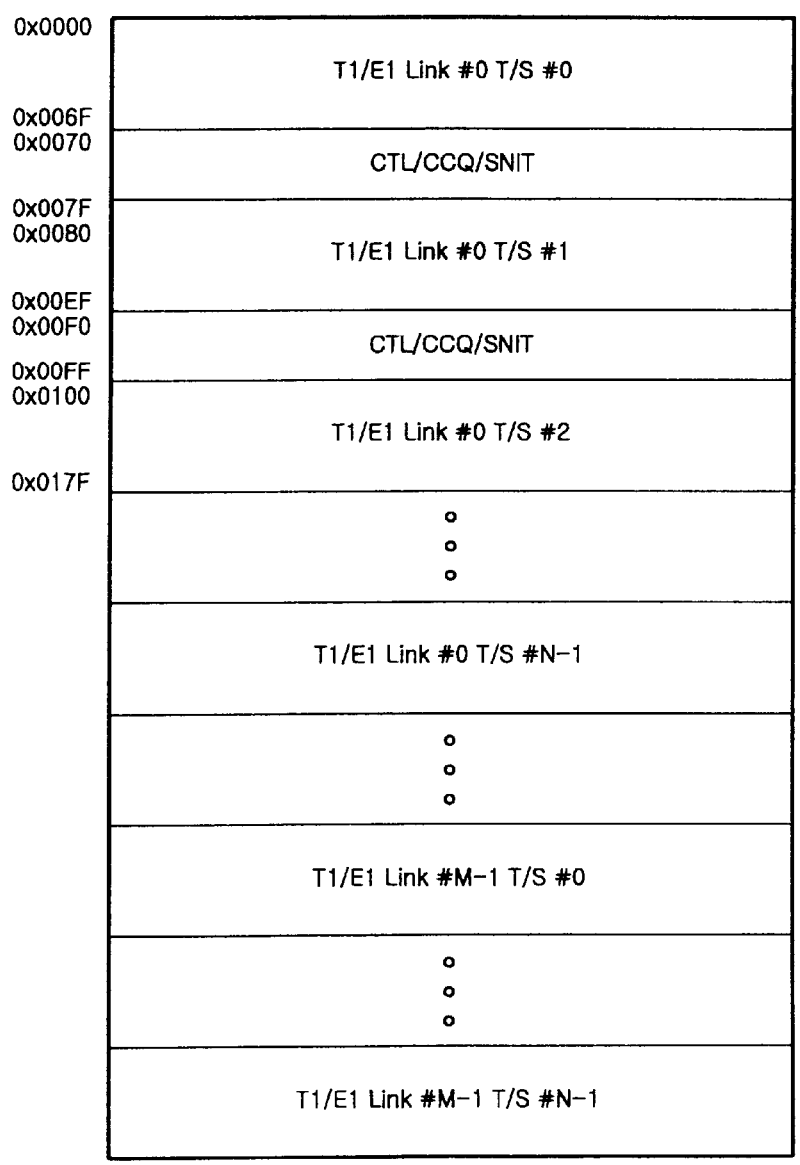
FIG. 7 is a diagram illustrating the entire memory map for transmit cell buffers used in the apparatus of FIG. 2.
Figure 8:
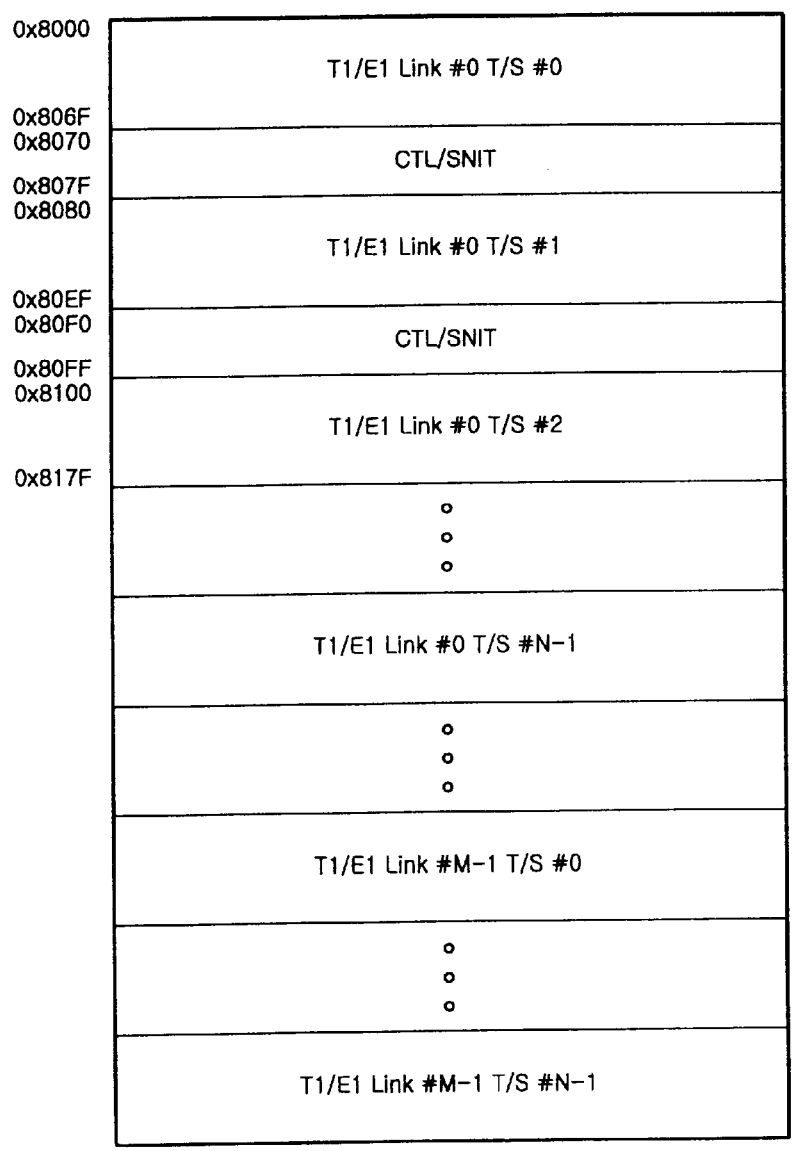
FIG. 8 is a diagram illustrating the entire memory map for receive cell buffers used in the apparatus of FIG. 2.

FIGS. 7 and 8 illustrate the entire memory maps of the TCB's and RCB's, respectively. As shown in FIGS. 7 and 8, a sequence number index table (SNIT) is recorded on each memory map at a particular address. The SNIT is a table in which convergence sublayer indicators (CSI's), sequence numbers (SN's) and sequence number protectors (SNP's) are combined together. A CCQ for storing the CBID of a complete ATM cell is also recorded on each memory map at a particular address. The SNIT is recorded by a CPU at the initial stage of the system. The recording of the SNIT is carried out in a manner as shown in FIG. 9.

Meanwhile, the TCBAB 16 controls an access to TCB's in each FSM status in accordance with the internal status signal from the STGB 11 whereas the RCBAB 26 controls an access to RCB's in each FSM status in accordance with the internal status signal from the STGB 21. For instance, the TCBAR 16 and RCBAR 26 allow the TDTCB 13 and CTTDB 23 to access the TCB's and RCB's in a T/S read/write status, respectively. In a cell read/write status, the TCBAR 16 and RCBAR 26 allow the TCCB 14 and RCCB 22 to access the TCB's and RCB's, respectively. In a CPU access status, the TCBAR 16 and RCBAR 26 allow the CPUAB's 15 and 25 to access the TCB's and RCB's, respectively. The ATM cell buffers for the TCB's and RCB's have the same control field type.

Figure 11A:
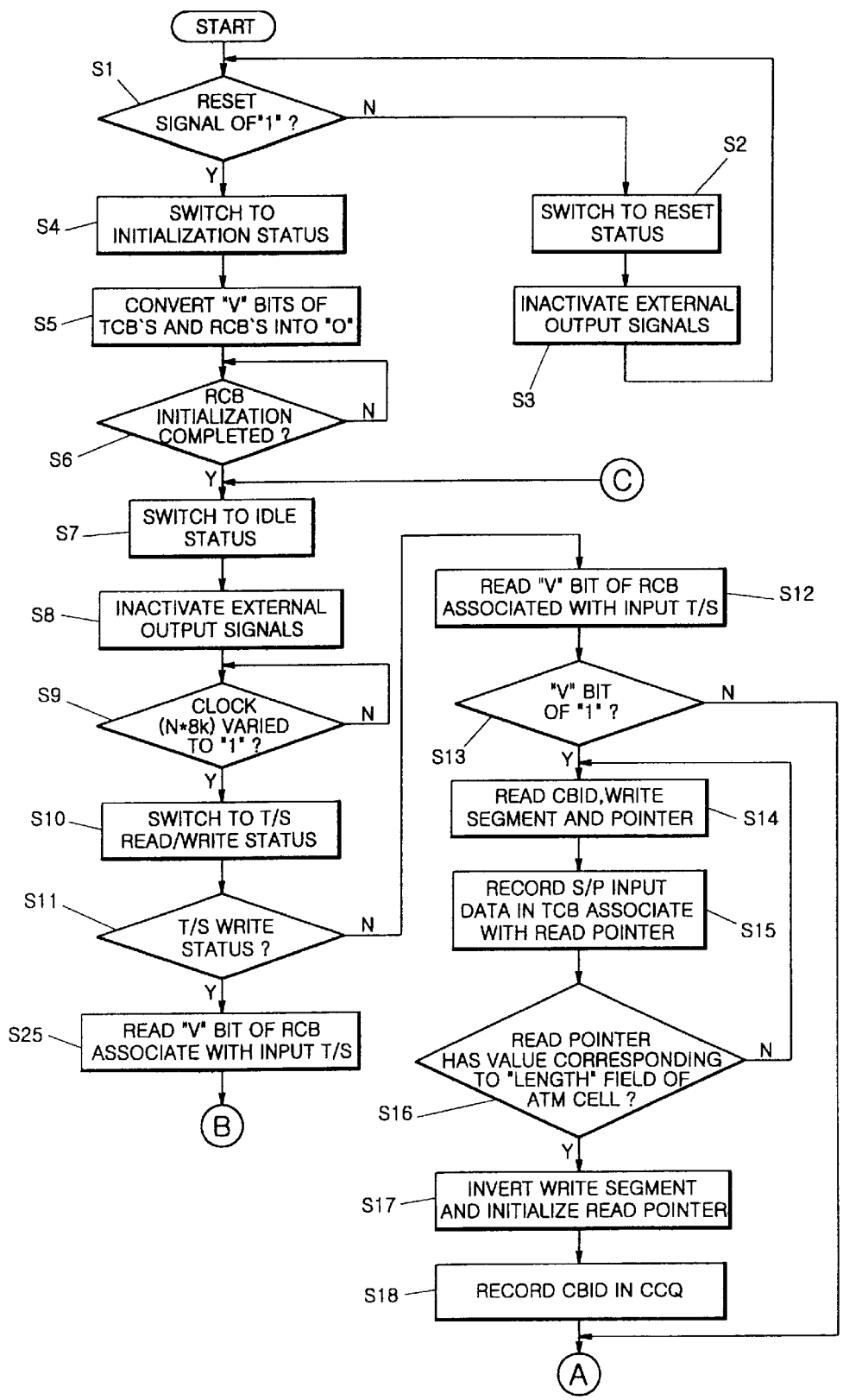
FIG. 11 is a flow chart illustrating a method for segmentation and reassembly CBR traffic in an ATM network in accordance with the present invention.
Figure 11B:
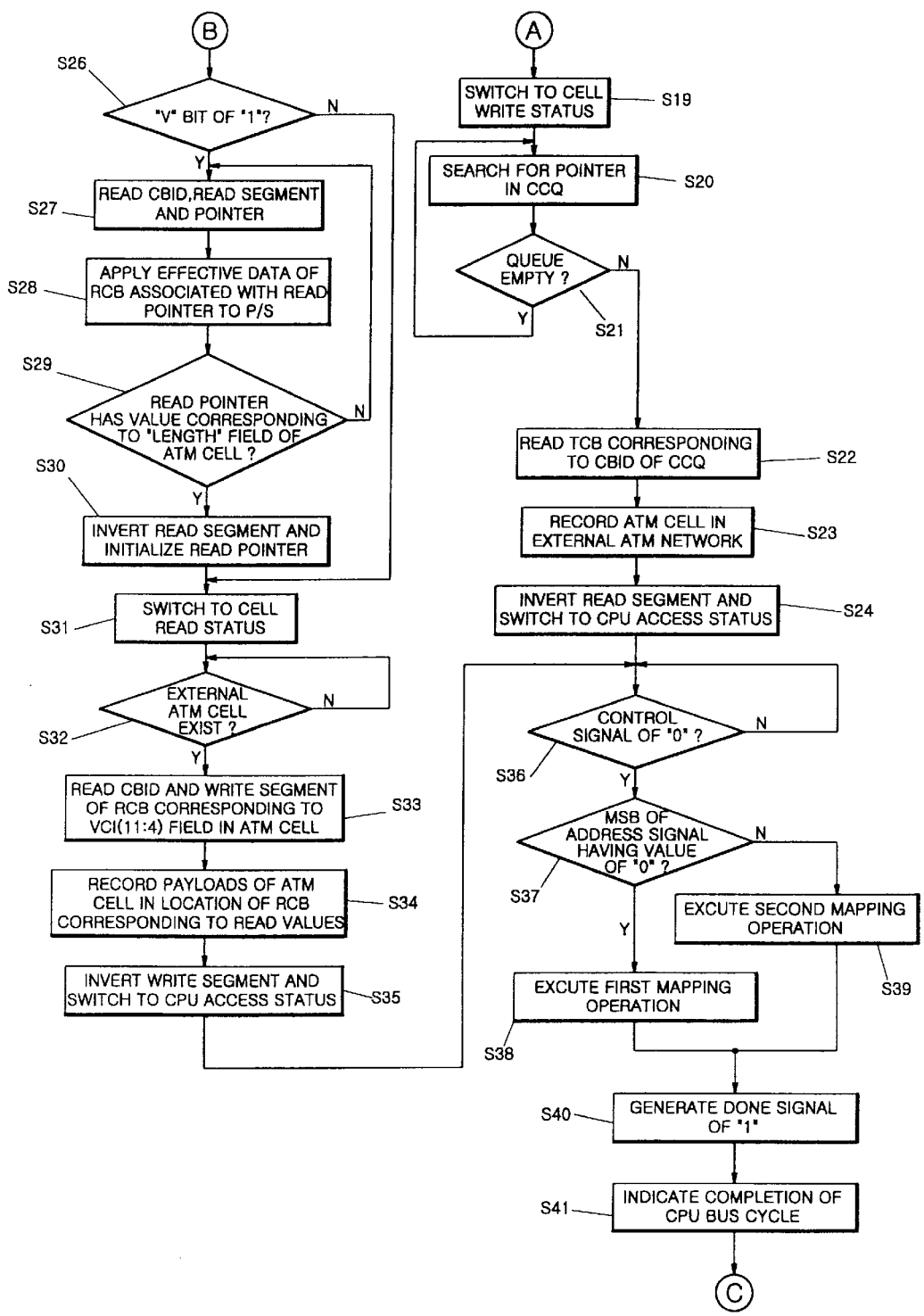

Operations of the CBR traffic segmentation and reassembly apparatus according to the present invention respectively associated with the six FSM statuses will be described in conjunction with a flow chart of FIG. 11.

First, each of the STGB 11 and 21 determines whether a reset signal applied thereto has a value of "0" or "1" (Step S1).

When the reset signals have a value of "0", the current FSM status is switched to a reset status (Step S2). In the reset status, all external output signals are inactivated (Step S3). When the reset signal has a value of "1", the current status is switched to an initialization status (Step S4).

In the initialization status, "valid (V)" bits of TCB's and RCB's are converted to have a value of "0" (Step S5). Thereafter, it is determined whether or not the initialization of the TCB's and RCB's is completed after the "V" bit value conversion (Step S6). After the initialization of all TCB's or RCB's, the current status is switched to an idle status (Step S7).

In the idle status, all external output signals are inactivated (Step S8). In the state in which all signals output from the STGB 11 or 21 are inactivated, it is determined whether or not a clock signal N*8K externally applied varies from "0" to "1" (Step S9). As best shown in the timing diagram of FIG. 4, the current status is switched to a T/S read/write status at the point of time a when the clock signal N*8K varies from "0" to "1" (Step S10). The "V" bit represents whether or not a call is established. When a call established, the "V" bit has a value of "1".

After the current status is switched to the T/S read/write status, it is determined whether the current status corresponds to a T/S read status or a T/S write status (Step S11).

In the T/S read status, the TDTCB 13 reads the "V" bit of the TCB associated with an input T/S (Step S12) and determines whether or not the read "V" bit has a value of "0" or "1" (Step S13). Where the read value corresponds to "0", the current status is switched to a cell write status. On the other hand, where the read value corresponds to "1", the current status is switched to a cell read status. In the cell read status, a CBID, a write segment and a pointer all associated with data input at the S/P 12 are read (Step S14). Subsequently, the input data is recorded in the TCB corresponding to the read pointer (Step S15). It is then determined whether or not the read pointer has a value corresponding to the "LENGTH" field of an ATM cell (Step S16). The CBID represents the position of a buffer in which input T1/E1 frame data is stored. The write segment represents a selected one of two cell buffers. The TDTCB 13 of the ATM cell generating unit 10 inverts the write segment value after one cell is completely recorded. The pointer represents the position on a 48-bit payload where input T1/E1 frame data is stored by the TDTCB 13 of the ATM cell generating unit 10.

Where the read pointer has a value not corresponding to the "LENGTH" field value, the step of reading the CBID, write segment and pointer is repeatedly executed until the read pointer has a value corresponding to the "LENGTH" field value. When the read pointer has a value corresponding to the "LENGTH" field value, the write segment value is inverted (Step S17). At step S17, the pointer is also initialized. The CBID is then recorded in the CCQ (Step S18). After completing these steps, the current status is switched to the cell write status (Step S19).

In the cell write status, the pointer of the CCQ is searched for (Step S20). It is then determined whether or not the queue is empty (Step S21). Where the queue is empty, the search for the pointer of the CCQ is executed until it is determined that the queue is not empty. Where the queue is not empty, the TCB associated with the CBID stored in the CCQ is read (Step S22). In this state, an associated ATM cell is recorded in an external ATM network (Step S23). After completing this operation, an associated read segment value is inverted (Step S24). After the read segment value inversion, the current status is switched to a CPU access status (Step S24). The read segment represents a selected one of two cell buffers. The TCCB 14 of the ATM cell generating unit 10 and the CTTDB 23 of the T1/E1 frame generating unit 20 invert a read segment value after completely reading one cell, respectively.

In the T/S write status, the "V" bit of the RCB associated with the input T/S is read (Step S25). Thereafter, it is determined whether or not the read "V" bit has a value of "0" or "1" (Step S26). Where the read value corresponds to "0", the current status is simply switched to a cell read status. On the other hand, where the read value corresponds to "1", a CBID, a read segment and a pointer all associated with the input T/S are read (Step S27). Subsequently, effective data, namely, payload, of the RCB corresponding to the read pointer is read. The read payload is applied to the P/S 24 (Step S28). It is then determined whether or not the read pointer has a value corresponding to the "LENGTH" field of an ATM cell (Step S29). In the case of RCB's, the CBID represents the position of a buffer in which input ATM cell data is stored. The write segment represents a selected one of two cell buffers. The CTTDB 23 of the T1/E1 frame generating unit 20 inverts the write segment value after one cell is completely read. The pointer represents the position on a 48-bit payload where output T1/E1 frame data is read by the CTTDB 23 of the T1/E1 frame generating unit 20.

Where the read pointer has a value not corresponding to the "LENGTH" field value, the step of reading the CBID, read segment and pointer is repeatedly executed until the read pointer has a value corresponding to the "LENGTH" field value. When the read pointer has a value corresponding to the "LENGTH" field value, the read segment value is inverted (Step S30). At step S30, the pointer is also initialized. After completing these steps, the current status is switched to the cell read status (Step S31).

In the cell read status, the RCCB 22 determines whether or not there is an external ATM cell (STEP 32). Where there is an external ATM cell, the CBID and write segment of the RCB corresponding to a VCI (11:4) field (FIG. 10) in the ATM cell are read (Step S33). Payloads 0 to 47 of the ATM cell are recorded in a location of the RCB corresponding to the read values (Step S34). After this write operation, the write segment is inverted (Step S35). In this state, the current status is switched to the CPU access status.

Figure 10:
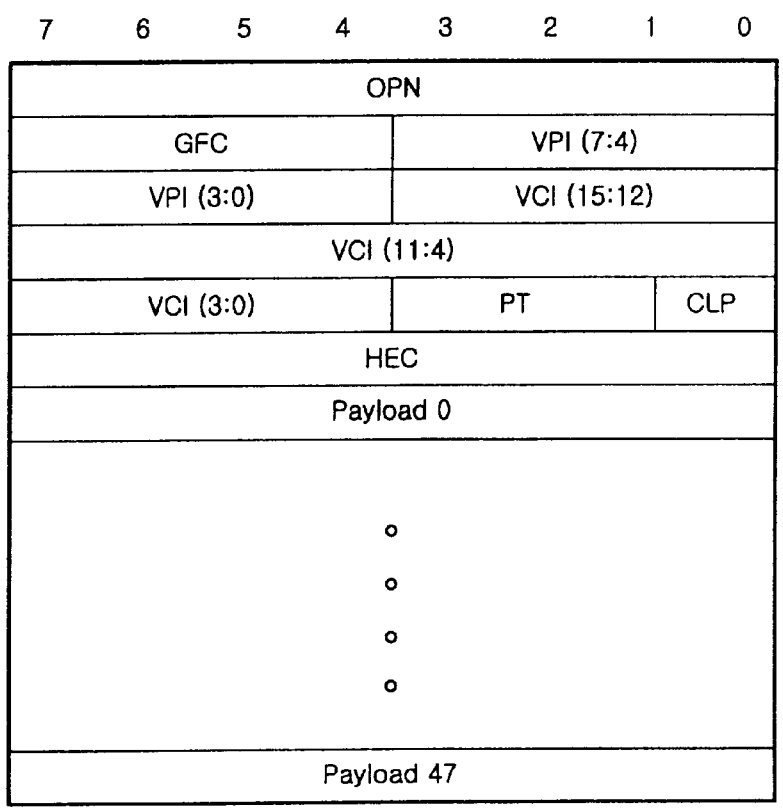
FIG. 10 is a diagram illustrating the ATM cell structure used in the apparatus of FIG. 2.

In FIG. 10, "OPN", which is an output port number for ATM cells selected for a switch path allocation. Output ports are mapped with bits of output data one by one. For example, where an output port corresponding to OPN 7 is selected, data of "1000000" is output. For data of "1111111", all output ports are selected. The VCI (11:4) includes a VCI (11:9) indicative of a T1/E1 frame and a VCI (8:4) indicative of a T/S. A VCI (15:12) is also included in the ATM cell structure. The VCI (15:12) is used for a future extension. A payload type (PT) is also included in the ATM cell structure. The PT is used to determine a future processing for operation and administration (OAM) cells and signal cells. However, such a PT is unused in accordance with the present invention. The ATM cell structure also includes a generic flow control (GFC), a cell loss priority (CLP), a VCI (7:4) and a VCI (3:0) which are unused in the present invention.

In the CPU access status, the CPUAB 15 determines whether a control signal CPU_CS generated from the CPU has a value of "0" or "1" (Step S36). When the control signal CPU_CS has a value of "0", it is then determined whether the most significant bit of an address signal CPU_ADDR generated from the CPU has a value of "0" or "1" (Step S37).

Where the most significant bit of the address signal CPU_ADDR has a value of "0", the CPUAB 15 executes a first mapping operation for mapping signals CPU_CS, CPU_RW, CPU_DATA and CPU_ADDR generated from the CPU into TCB signals TCB_CS, TCB_RW, TCB_DATA and TCB_ADDR (Step S38). On the other hand, where the most significant bit of the address signal CPU_ADDR has a value of "1", the CPUAB 15 executes a second mapping operation for mapping the signals CPU_CS, CPU_RW, CPU_DATA and CPU_ADDR into RCB signals RCB_CS, RCB_RW, RCB_DATA and RCB_ADDR (Step S39). After completing the mapping operation, the CPUAB 15 generates a done signal CPU_DONE having a value of "1" (Step S40). This done signal CPU_DONE is applied to the CPU, so that the CPU is informed of the completion of the CPU bus cycle (Step S41). Thereafter, the current status is switched to the idle status.

Figure 4:
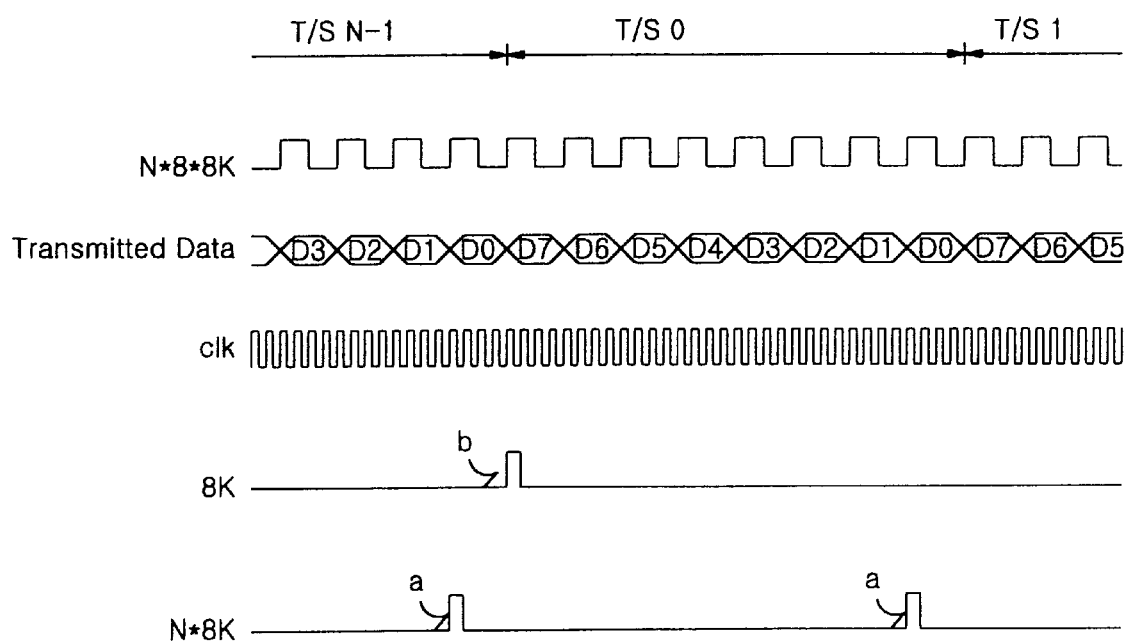
FIG. 4 is a timing diagram of signals externally applied to the apparatus of FIG. 2.

The above-mentioned operation of the CBR traffic segmentation and reassembly apparatus is repeated between successive idle statuses, namely, between adjacent ones of the points a shown in the timing diagram of FIG. 4. In accordance with the present invention, a standardized and simple status transition is obtained. Accordingly, it is possible to accommodate an increased number of T1/E1 connections. The apparatus of the present invention may also be operatively connected to an ATM switch such as the ATM transceiver 36. In this case, it is possible to replace, with the ATM switch, audio switches of a conventional time division multiplex (TDM) system configured to spatially and temporally exchange PCM data. Accordingly, a considerable improvement in the costs and installation volume of large-scale audio switches is achieved.

As apparent from the above description, in accordance with the present invention, external ATM cells are stored in buffers under the condition in which particular control fields are added to those ATM cells by the T1/E1 frame generating unit. Also, T1/E1 frame data is read and converted into an ATM cell by the ATM cell generating unit according to the present invention. The ATM cell is then stored in a buffer. ATM cells stored in the buffer are read in a sequential manner. The read data is recorded on a particular T/S of the T1/E1 frame or transmitted to an ATM network. Accordingly, it is possible to reduce the installation volume and costs of the CBR traffic segmentation and reassembly apparatus in the ATM network. The apparatus of the present invention may also be operatively connected to an ATM switch such as an ATM transceiver. In this case, it is possible to replace, with the ATM switch, audio switches of a conventional TDM system configured to spatially and temporally exchange PCM data. Accordingly, a considerable improvement in the costs and installation volume of large-scale audio switches is achieved.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for segmentation and reassembly of constant bit rate traffic in an asynchronous transfer mode (ATM) network comprising:

an ATM cell generating unit for reading a value included in an external T1/E1 frame and generating an ATM cell based on the read value; and a T1/E1 frame generating unit for reading an external ATM cell and generating a T1/E1 frame based on the read ATM cell, wherein the ATM cell generating unit comprises:

a state timing generation block for externally receiving clock signals (8K, N*8K and CLK), thereby configuring a finite state machine and a plurality of counters;

a serial to parallel converter for externally receiving clock signals (N*8K and N*8*8K) and receiving serial data from a T1/E1 transceiver, the serial to parallel converter serving to convert the received serial data into 8-bit parallel data;

a time-slot data to cell block for reading the parallel data from the serial to parallel converter in sync with the clock signal (N*8K) applied thereto via the state timing generation block, extracting time/slot data of the input T1/E1 frame, determining whether or not the extracted data should be discarded, based on control information read from transmit cell buffers, recording the extracted data in an associated transmit cell buffer where the extracted data is effective, and recording an associated cell buffer identification in a complete cell queue when ATM cells are completely accumulated in the associated transmit cell buffer;

a transmit cell control block for searching the complete cell queue in response to a signal indicative of the status of the finite state machine configured by the state timing generation block, thereby recording ATM cells (CELL_WR and CELL_DATA) of the associated transmit cell buffer in an external cell buffer;

a CPU access block for controlling a CPU and transmit cell buffer access in response to the signal indicative of the status of the finite state machine configured by the state timing generation block, thereby receiving signals (CPU_CS, CPU_RW and CPU_ADDR) from associated CPU's while exchanging CPU data (CPU_DATA) with the associated CPU's; and a transmit cell buffer access block for controlling a transmit cell buffer access among the time-slot data to cell block, transmit cell control block and CPU access block in accordance with the signal indicative of the status of the finite state machine configured by the state timing generation block, thereby applying transmit cell buffer signals (TCB_CS, TCB_RW and TCB_ADDR) to the transmit cell buffer while exchanging transmit cell buffer data (TCB_DATA) with the transmit cell buffer.

2. An apparatus for segmentation and reassembly of constant bit rate traffic in an asynchronous transfer mode (ATM) network comprising:

an ATM cell generating unit for reading a value included in an external T1/E1 frame and generating an ATM cell based on the read value; and a T1/E1 frame generating unit for reading an external ATM cell and generating a T1/E1 frame based on the read ATM cell, wherein the T1/E1 frame generating unit comprises:

a state timing generation block for externally receiving clock signals (8K, **N*8K and CLK**), thereby configuring a finite state machine and a plurality of counters;

a receive cell control block for reading an input ATM cell (CELL_DATA) in response to a signal indicative of the status of the finite state machine configured by the state timing generation block, thereby determining whether or not the input ATM cell is effective, and recording the read data (CELL_RD) as an ATM cell in an associated receive cell buffer where the input ATM cell is effective;

a cell to time-slot data block for reading receive cell buffers in sync with the clock signal (**N*8K**) applied thereto via the state timing generation block, and generating parallel data corresponding to the read data in order to record the read data on an associated time/slot of a T1/E1 frame to be generated;

a parallel to serial converter for externally receiving clock signals (**N*8K and N*8*8K**), converting the parallel data received from the cell to time-slot data block into serial, and recording the serial data in an associated time/slot of the T1/E1 frame;

a CPU access block for controlling a CPU and transmit cell buffer access in response to the signal indicative of the status of the finite state machine configured by the state timing generation block, thereby receiving CPU signals (CPU_CS, CPU_RW and CPU_ADDR) from associated CPU's while exchanging CPU data (CPU_DATA) with the associated CPU's; and a receive cell buffer access block for controlling a receive cell buffer access among the receive cell control block, CPU access block and cell to time-slot data block in accordance with the signal indicative of the status of the finite state machine configured by the state timing generation block, thereby applying receive cell buffer signals (RCB_CS, RCB_RW and RCB_ADDR) to the receive cell buffer while exchanging receive cell buffer data (RCB_DATA) with the receive cell buffer.

3. A method for segmentation and reassembly constant bit rate traffic in an ATM network in accordance with the status of a finite state machine (FSM), comprising the steps of:

(a) determining whether a reset signal generated has a value of "0" or "1", switching the current FSM status to a reset status when the reset signal has a value of "0", and inactivating all external output signals, while switching the current FSM status to an initialization status when the reset signal has a value of "1";

(b) converting "valid" bits of transmit and receive cell buffers to have a value of "0" in the initialization status, and then switching the current FSM status to an idle status;

(c) inactivating all external output signals In the idle status, determining whether or not a clock signal (N*8K) externally applied varies from "0" to "1", and switching the current FSM status to a time/slot read/write status when the clock signal (N*8K) varies from "0" to "1";

(d) determining whether the current FSM status corresponds to a time/slot read status or a time/slot write status, reading the "valid" bit of transmit cell buffers associated with an input time/slot in the time/slot read status, and switching the current FSM status to a cell write status when the read "valid" bit of transmit cell buffers has a value of "0";

(e) reading a cell buffer identification, a write segment and a pointer all associated with input data when the read "valid" bit of transmit cell buffers has a value of "1", and recording data, input at a serial to parallel converter, in a transmit cell buffer corresponding to the read pointer, determining whether or not the read pointer has a value corresponding to a "LENGTH" field of an ATM cell, inverting the write segment value when the read pointer has a value corresponding to the "LENGTH" field value, and initializing the read pointer, recording the read cell buffer identification in a complete cell queue, and then switching the current FSM status to the cell write status;

(f) searching for the pointer of the complete cell queue in the cell write status, determining whether or not the complete cell queue is empty, reading the transmit cell buffer associated with the cell buffer identification stored in the complete cell queue where the complete cell queue is not empty, recording an associated ATM cell in an external ATM network, inverting a read segment, and then switching the current FSM status to a CPU access status;

(g) reading the "valid" bit of receive cell buffers associated with the input time/slot when it is determined at step (d) that the current FSM status corresponds to a time/slot write status, and switching the current FSM status to a cell write status when the read "valid" bit of transmit cell buffers has a value of "0";

(h) reading a cell buffer identification, a read segment and a pointer when the read "valid" bit of a receive cell buffer has a value of "1", and sending effective data of the receive cell buffer to a parallel to serial converter, determining whether or not the read pointer has a value corresponding to a "LENGTH" field of an ATM cell, inverting the read segment value when the read pointer has a value corresponding to the "LENGTH" field value, and initializing the read pointer, and then switching the current FSM status to the cell read status;

(i) determining whether or not there is an external ATM cell in the cell read status, reading a cell buffer identification and a write segment of the receive cell buffer corresponding to a VCI (11:4) field (FIG. 10) in an ATM cell when the ATM cell exists, recording affective data of the ATM cell in a location of the RCB corresponding to the read values, inverting the write segment, and then switching the current FSM status to the CPU access status;

(j) determining whether a control signal (CPU_CS) generated from a CPU has a value of "0" or "1" in the CPU access status, and it is then determining whether the most significant bit of an address signal (CPU_ADDR) generated from the CPU has a value of "0" or "1" when the control signal (CPU_CS) has a value of "0;

(k) executing a first mapping operation for mapping signals (CPU_CS, CPU_RW, CPU_DATA and CPU_ADDR) generated from the CPU into transmit cell buffer signals (TCB_CS, TCB_RW, TCB_DATA and TCB_ADDR) when the most significant bit of the address signal CPU_ADDR has a value of "0", while executing a second mapping operation for mapping the signals (CPU_CS, CPU_RW, CPU_DATA and CPU_ADDR) into receive cell buffer signals (RCB_CS, RCB_RW, RCB_DATA and RCB_ADDR) when the most significant bit of the address signal (CPU_ADDR) has a value of "1"; and (1) generating a done signal (CPU_DONE) having a value of "1" after completing the first and second mapping operations, thereby informing the CPU of the completion of the CPU bus cycle, and then switching the current FSM status to the idle status.

4. An apparatus to segment and reassemble an asynchronous transfer mode (ATM) cell of constant bit rate traffic in an ATM network, comprising:

a state timing generation block which configures a finite state machine and a plurality of time slot counters according to external clock signals;

a serial to parallel converter which converts serial data of a T1/E1 line into parallel data according to external clock signals;

a time-slot data to cell block which extracts time slot data from the parallel data outputted from said serial to parallel converter, records the time slot data in a transmit cell buffer, and records cell buffer identification in a complete cell queue;

a transmit cell control block which searches the complete cell queue, and records an ATM cell of the transmit cell buffer in an output FIFO;

a CPU access block which controls access of the transmit cell buffer between a CPU and internal blocks; and a transmit cell buffer access block, which controls access of the transmit cell buffer among the internal blocks according to a state of the finite state machine.

5. The apparatus of claim 4, wherein said state timing generation block generates a signal indicative of the state of the finite state machine, initializes the value of the state signal, increases the value by the time slot counters, and transmits the state signal to other internal blocks.

6. An apparatus to segment and reassemble an asynchronous transfer mode (ATM) cell of constant bit rate traffic in an ATM network, comprising:

a state timing generation block which configures a finite state machine and a plurality of time slot counters according to external clock signals;

a receive cell control block which records an effective cell of the ATM cell in a receive cell buffer;

a cell to time slot data block which reads parallel data from the receive cell buffer to record on a time slot of a T1/E1 line;

a parallel to serial converter which converts the parallel data outputted from said cell to time slot data block into serial data according to external clock signals;

a CPU access block which controls access of the receive cell buffer between a CPU and internal blocks; and a receive cell buffer access block which controls access of the receive cell buffer among the internal blocks according to a state of the finite state machine.

7. The apparatus of claim 6, wherein said state timing generation block generates a signal indicative of the state of the finite state machine, initializes the value of the state signal, increases the value by the time slot counters, and transmits the state signal to other internal blocks.

8. A method for segmenting and reassembling an asynchronous transfer mode (ATM) cell of constant bit rate traffic in an ATM network, comprising the steps of:

inactivating all external output signals by a reset signal, and switching a finite state machine to an initialization state;

initializing a receive cell buffer and a transmit cell buffer in the initialization state, and switching the finite state machine to an idle state;

re-inactivating all external output signals in the idle state, and switching the finite state machine to a time slot read/write state or a cell write/read state according to a valid bit of the receive cell buffer and the transmit cell buffer;

searching the pointer of a complete cell queue in the cell write state, reading and recording the ATM cell of the transmit cell buffer corresponding to the cell buffer identification, and switching the finite state machine to a CPU access state after a read segment is inverted; and checking the most significant bit of a CPU address signal according to a CPU control signal in the CPU access state, mapping CPU output signals to transmit cell buffer signals or receive cell buffer signals according to the most significant bit, and switching the finite state machine to the idle state after the completion of a CPU bus cycle is informed.

9. The method of claim 8, further comprising the steps of:

determining whether there is an external ATM cell in the cell read state, reading a cell buffer identification and a write segment of the receive cell buffer corresponding to a virtual channel identifier field of the ATM cell, recording data of the ATM cell in the receive cell buffer corresponding to the read values, and switching the finite state machine to a CPU access state after the write segment is inverted; and checking the most significant bit of a CPU address signal according to a CPU control signal in the CPU access state, mapping CPU output signals to transmit cell buffer signals or receive cell buffer signals according to the most significant bit, and switching the finite state machine to the idle state after the completion of a CPU bus cycle is informed.

10. The method of claim 8, further comprising the steps of:

reading a cell buffer identification, a write segment and a pointer in the time slot read state, and recording parallel data in the transmit cell buffer corresponding to the pointer;

inverting the write segment, initializing the pointer, and recording the cell buffer identification in a complete cell queue, when the pointer has a value corresponding to a "LENGTH" field of the ATM cell, and then switching the finite state machine to a cell write state;

searching the pointer of the complete cell queue in the cell write state, reading and recording the ATM cell of the transmit cell buffer corresponding to the cell buffer identification, and then switching the finite state machine to a CPU access state after a read segment is inverted; and checking the most significant bit of a CPU address signal according to a CPU control signal in the CPU access state, mapping CPU output signals to transmit cell buffer signals or receive cell buffer signals according to the most significant bit, and switching the finite state machine to the idle state after the completion of a CPU bus cycle is informed.

11. The method of claim 8, further comprising the steps of:

reading a cell buffer identification, a read segment and a pointer in the time slot write state, reading parallel data in a receive cell buffer corresponding to the pointer, and converting the parallel data into serial data;

inverting the read segment, and initializing the pointer, when the pointer has a value corresponding to a "LENGTH" field of the ATM cell, and then switching the finite state machine to a cell read state;

determining whether there is an external ATM cell in the cell read state, reading a cell buffer identification and a write segment of the receive cell buffer corresponding to a virtual channel identifier field of the ATM cell, recordingdata of the ATM cell in the receive cell buffer corresponding to the read values, and switching the finite state machine to a CPU access state after the write segment is inverted;

checking the most significant bit of a CPU address signal according to a CPU control signal in the CPU access state, mapping CPU output signals to transmit cell buffer signals or receive cell buffer signals according to the most significant bit, and switching the finite state machine to the idle state after the completion of a CPU bus cycle is informed.

12. An apparatus for an asynchronous transfer mode (ATM) network, comprising:

a state timing generation block which configures a finite state machine and a plurality of time slot counters according to external clock signals;

a serial to parallel converter which converts serial data of a T1/E1 line into parallel data according to external clock signals;

a time slot data to cell block which extracts time slot data from the parallel data outputted from said serial to parallel converter, records the time slot data in a transmit cell buffer, and records cell buffer identification in a complete cell queue;

a transmit cell control block which searches the complete cell queue, and records an ATM cell of the transmit cell buffer in an output FIFO;

a receive cell control block which records an effective cell of the ATM cell in a receive cell buffer;

a cell to time slot data block which reads parallel data from the receive cell buffer to record on a time slot of the T1/E1 line;

a parallel to serial converter which converts the parallel data outputted from said cell to time slot data block into serial data according to external clock signals;

a CPU access block to control access of the transmit cell buffer or the receive cell buffer between a CPU and internal blocks; and a cell buffer access block to control access of the transmit cell buffer or the receive cell buffer among the internal blocks according to a state of the finite state machine.

13. The apparatus of claim 12, wherein said state timing generation block generates a signal indicative of the state of the finite state machine, initializes the value of the state signal, increases the value by the time slot counters, and transmits the state signal to other internal blocks.

* * * * *